US009639720B2

(12) United States Patent
Digiovanna

(10) Patent No.: US 9,639,720 B2
(45) Date of Patent: May 2, 2017

(54) SYSTEM AND METHOD OF AUTOMATICALLY AVOIDING SIGNAL INTERFERENCE BETWEEN PRODUCT PROXIMITY SUBSYSTEMS THAT EMIT SIGNALS THROUGH MUTUALLY FACING PRESENTATION WINDOWS OF DIFFERENT WORKSTATIONS

(71) Applicant: SYMBOL TECHNOLOGIES, INC., Lincolnshire, IL (US)

(72) Inventor: Robert W Digiovanna, Shirley, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 400 days.

(21) Appl. No.: 14/536,862

(22) Filed: Nov. 10, 2014

(65) Prior Publication Data
US 2016/0132702 A1 May 12, 2016

(51) Int. Cl.
*G06K 15/00* (2006.01)
*G06K 7/00* (2006.01)
*G06K 7/10* (2006.01)

(52) U.S. Cl.
CPC ......... *G06K 7/0095* (2013.01); *G06K 7/1096* (2013.01); *G06K 7/10544* (2013.01); *G06K 7/10821* (2013.01)

(58) Field of Classification Search
CPC ............. G06K 7/0095; G06K 7/10544; G06K 7/10821; G06K 7/1096
USPC ................................................. 235/383, 385
See application file for complete search history.

(56) References Cited

U.S. PATENT DOCUMENTS

| 7,997,486 | B2* | 8/2011 | Ulrich | G06K 7/10346 235/383 |
|---|---|---|---|---|
| 8,727,218 | B1 | 5/2014 | Handshaw et al. | |
| 2002/0104886 | A1 | 8/2002 | Martin et al. | |
| 2005/0077358 | A1 | 4/2005 | Boehm et al. | |
| 2005/0167493 | A1* | 8/2005 | Barton | A47F 9/047 235/383 |
| 2007/0034692 | A1* | 2/2007 | Johnson | G07G 1/009 235/383 |

(Continued)

FOREIGN PATENT DOCUMENTS

CA 2754586 A1 4/2012

OTHER PUBLICATIONS

Search Report from corresponding European Patent Application No. 15191897.6 mailed on Mar. 4, 2016.

*Primary Examiner* — Seung Lee

(57) ABSTRACT

Signal interference is automatically avoided between product proximity subsystems that emit signals through mutually facing presentation windows of different workstations. A magnetometer in each workstation determines a direction faced by a respective presentation window. A controller in each workstation controls a respective product proximity subsystem to emit and receive a signal with a first signal characteristic when the respective magnetometer determines that the respective presentation window faces a first direction, and controls a respective product proximity subsystem to emit and receive a signal with a different second signal characteristic when the respective magnetometer determines that the respective presentation window faces a different second direction.

18 Claims, 5 Drawing Sheets

(56) References Cited

U.S. PATENT DOCUMENTS

2008/0306708 A1    12/2008   Grmain et al.
2009/0224047 A1     9/2009   Johnston
2012/0088526 A1     4/2012   Lindner

* cited by examiner

SYSTEM AND METHOD OF AUTOMATICALLY AVOIDING SIGNAL INTERFERENCE BETWEEN PRODUCT PROXIMITY SUBSYSTEMS THAT EMIT SIGNALS THROUGH MUTUALLY FACING PRESENTATION WINDOWS OF DIFFERENT WORKSTATIONS

BACKGROUND OF THE INVENTION

The present disclosure relates generally to a system for, and a method of, automatically avoiding signal interference between product proximity subsystems that emit signals through mutually facing presentation windows of different workstations.

Point-of-transaction workstations employing laser-based readers and/or imager-based readers have been used in many venues, such as supermarkets, department stores and other kinds of retail settings, as well as libraries and parcel deliveries and other kinds of public settings, as well as factories, warehouses and other kinds of industrial settings, for many years. Such workstations were often configured either as stand-mounted scanners each resting on a counter and having a presentation window; or as vertical slot scanners each resting on, or built into, the counter and having a generally vertically arranged, upright presentation window; or as flat-bed or horizontal slot scanners each resting on, or built into, the counter and having a generally horizontally arranged presentation window; or as bi-optical, dual window scanners each resting on, or built into, the counter and having both a generally horizontal presentation window supported by a generally horizontal platform and a generally vertically arranged, upright presentation window supported by a generally upright tower. Such workstations were often operated to electro-optically read a plurality of symbol targets, such as one-dimensional symbols, particularly Universal Product Code (UPC) bar code symbols, truncated symbols, stacked symbols, and two-dimensional symbols, as well as non-symbol targets, such as driver's licenses, receipts, signatures, etc., the targets being associated with, or borne by, objects or products to be processed by, e.g., purchased at, the workstations.

A user, such as an operator or a customer, slid or swiped a product associated with, or bearing, the target in a moving direction across and past a respective presentation window in a swipe mode, or momentarily presented, and steadily momentarily held, the target associated with, or borne by, the product to an approximate central region of the respective presentation window in a presentation mode. The products could be moved relative to the respective window in various directions, for example, from right-to-left, or left-to-right, and/or in-and-out, or out-and-in, and/or high-to-low, or low-to-high, or any combination of such directions, or could be positioned either in contact with, or held at a working distance away from, either window during such movement or presentation. The choice depended on the type of the workstation, or on the user's preference, or on the layout of the venue, or on the type of the product and target. Return light returning from the target in the laser-based reader and/or in the imager-based reader was detected to generate an electrical signal indicative of the target. The electrical signal was then processed, and, when the target was a symbol, was decoded, and read, thereby identifying the product.

Each workstation typically had an illuminator or illumination subsystem to illuminate the target with illumination light over an illumination field. Preferably, to reduce electrical power consumption, to prolong operational lifetime, and to reduce bright light annoyance to operators and customers, the illumination light was not generated at all times, but was generated in response to detection of return infrared (IR) light by an IR-based, product proximity or object sensor subsystem that included an IR emitter operative for emitting IR light into an IR emission field, and an IR sensor for sensing the return IR light within an IR detection field of view. A product entering the IR emission field reflected and/or scattered at least a portion of the emitted IR light incident on the product to the IR sensor. Detection of this return IR light by the IR sensor determined that the product had indeed entered the workstation, thereby triggering the illumination system and the reading of the target.

Although generally satisfactory for their intended purpose, one issue with such known presentation-type workstations involved the accidental generation of the illumination light when at least two presentation windows of different workstations faced each other. In some venue layouts, the IR sensor of a first workstation looking through a first presentation window might be so positioned so as to sense the IR light emitted by the IR emitter through a second presentation window of a second workstation. For example, this could occur when the first and second workstations were situated across an aisle such that their respective upright presentation windows generally faced each other. Put another way, the IR detection field of view of the IR sensor of the first workstation at least partially overlapped the IR emission field of the IR emitter of the second workstation. This accidental generation of the illumination light was not only very bothersome and annoying to operators and customers, but also wasted electrical power, and shortened the operational lifetime of the workstations.

To prevent such accidental generation of the illumination light, it was known to manually retrofit and individually configure each workstation. Thus, each workstation had to be manually reprogrammed in situ. This procedure had to be customized for each venue layout and required skilled personnel and non-negligible time to complete. If the procedure was done improperly, then false triggering of the illumination light continued.

Accordingly, there is a need to reduce such electrical power consumption, to prolong such operational lifetime, and to reduce such bright light annoyance to operators and customers by avoiding such accidental generation of the illumination light when the presentation windows of different workstations generally face each other, and to do so in an automatic manner that requires no skilled personnel or manual procedures of any kind.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
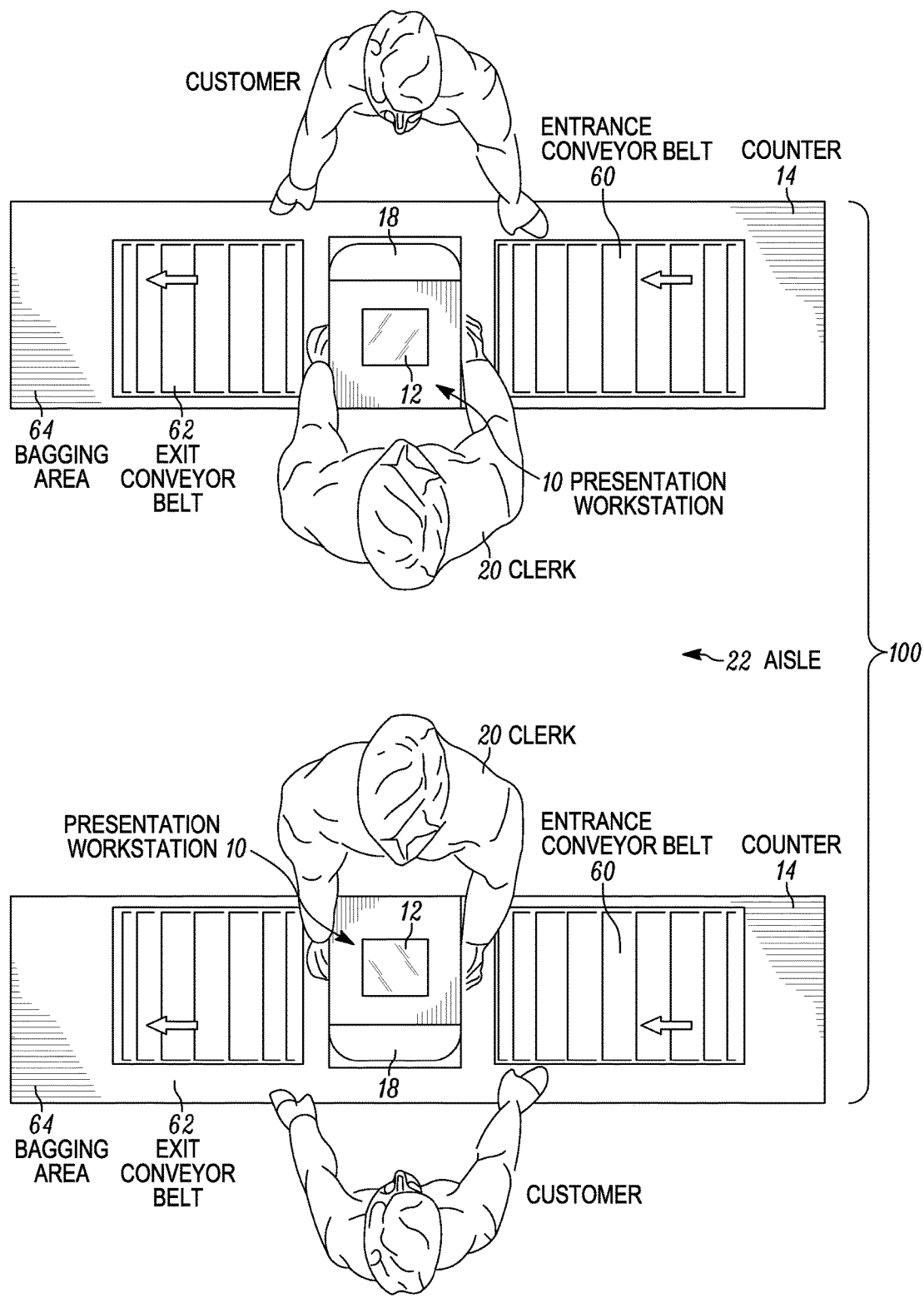
FIG. 1 is a top plan view of an exemplary venue layout in which the system of the present disclosure has particular utility, the layout having different workstations with mutually facing presentation windows.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates to a system for automatically avoiding signal interference between product proximity subsystems that emit signals through mutually facing presentation windows of different workstations. A magnetometer is mounted in each workstation. Each magnetometer determines a direction faced by a respective presentation window. A controller is mounted in each workstation and is operatively connected to each magnetometer and each product proximity subsystem. Each controller controls a respective product proximity subsystem to emit and receive a signal with a first signal characteristic when the respective magnetometer determines that the respective presentation window faces a first direction, and controls a respective product proximity subsystem to emit and receive a signal with a second signal characteristic, which is different from the first signal characteristic, when the respective magnetometer determines that the respective presentation window faces a second direction, which is different from the first direction.

In a preferred embodiment, each controller has a memory in which the first and second signal characteristics are stored; and each controller selects the first stored signal characteristic when the respective magnetometer determines the first direction, and selects the second stored signal characteristic when the respective magnetometer determines the second direction. Each workstation includes an illumination subsystem to illuminate a product with illumination light, and each proximity subsystem includes an infrared (IR) emitter operative for emitting IR light through a respective presentation window into an IR emission field, and an IR sensor for sensing return IR light from the product through a respective presentation window within an IR detection field of view. Each controller energizes the respective illumination subsystem when the respective proximity subsystem detects the product, and does not energize the respective illumination subsystem when the first and second signal characteristics are different, i.e., when their respective presentation windows face in opposite directions. Advantageously, the first and second signal characteristics differ in signal frequency and/or in signal coding modulation and/or in some other characteristic.

A method, in accordance with another aspect of this disclosure, of automatically avoiding signal interference between product proximity subsystems that emit signals through mutually facing presentation windows of different workstations, is performed by determining a direction faced by a respective presentation window; controlling a respective product proximity subsystem to emit and receive a signal with a first signal characteristic upon the determination that the respective presentation window faces a first direction; and controlling a respective product proximity subsystem to emit and receive a signal with a second signal characteristic, which is different from the first signal characteristic, upon the determination that the respective presentation window faces a second direction, which is different from the first direction.

Figure 2:
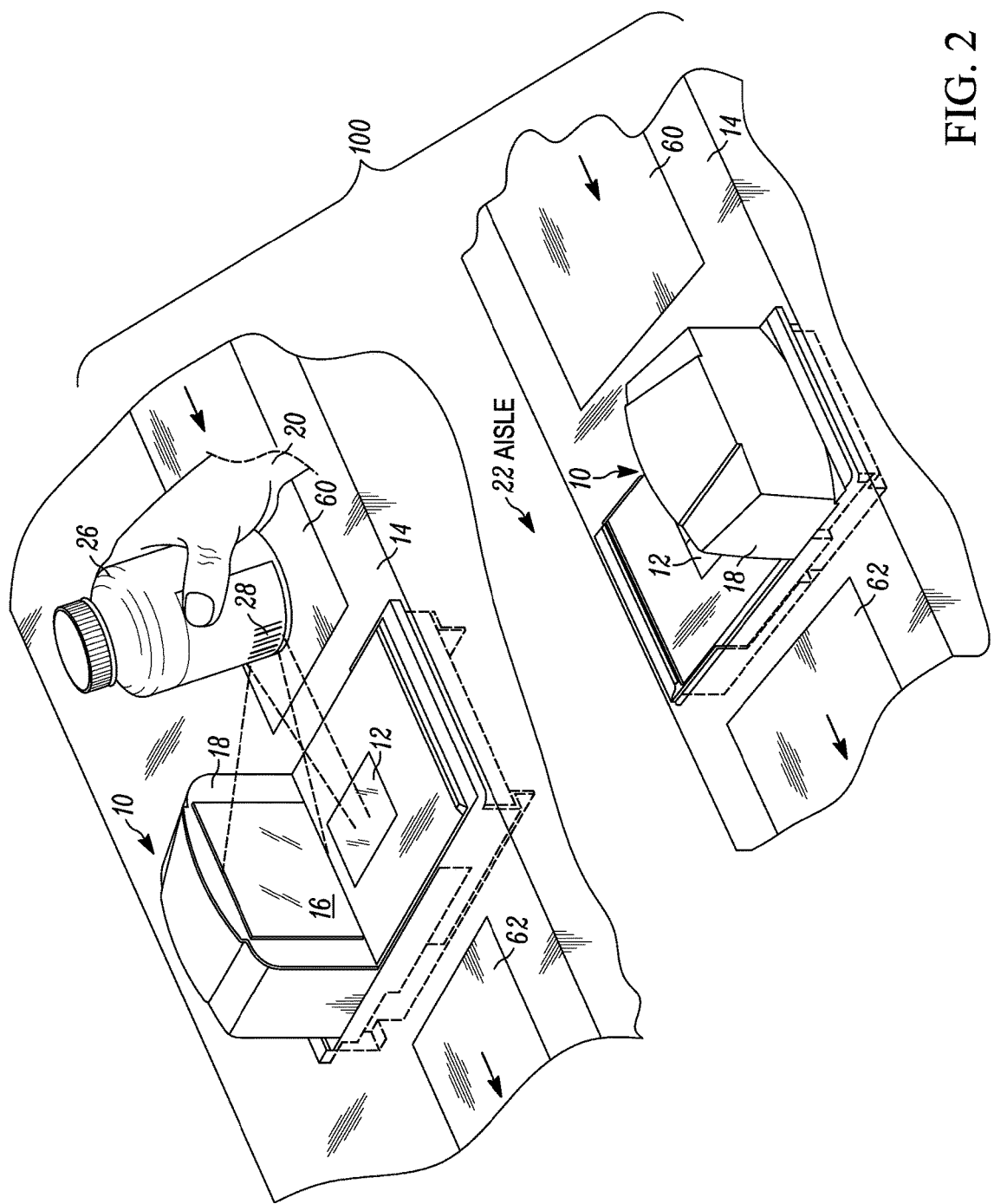
FIG. 2 is a broken-away, perspective view of the venue layout of FIG. 1 in use.
Figure 3:
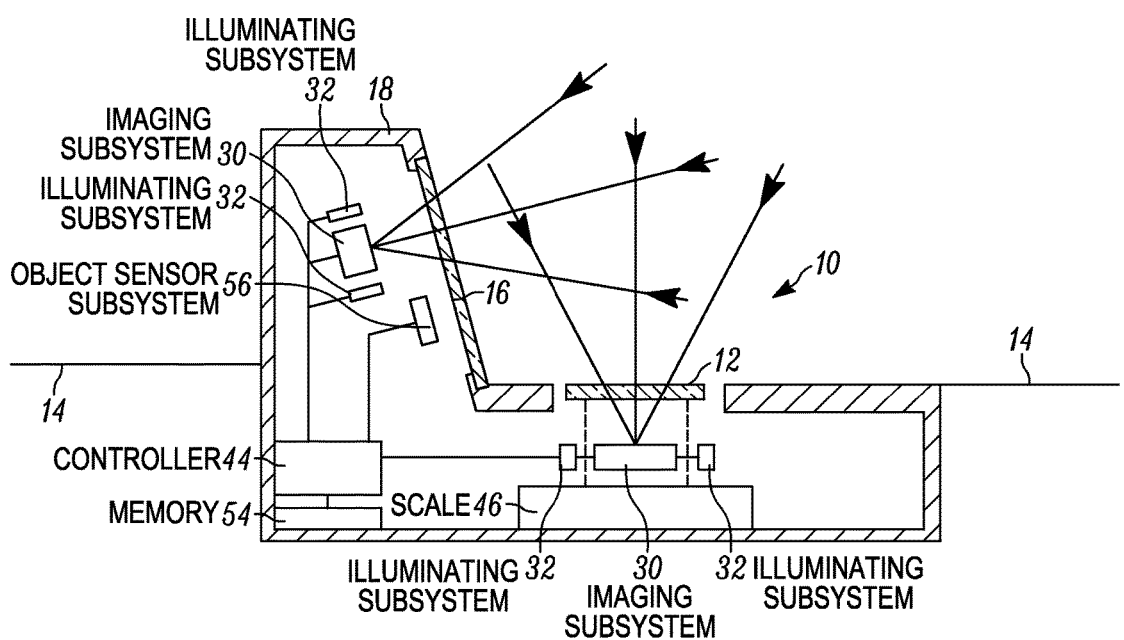
FIG. 3 is a schematic diagram depicting components of each workstation of FIG. 1.

Turning now to the drawings, FIGS. 1-2 depict a checkout system 100 that includes a pair of dual window, bi-optical, point-of-transaction workstations 10 mirror-symmetrically situated on counters 14 generally opposite each other across an aisle 22 between the counters 14. Although two workstations 10 have been illustrated in mirror-symmetrical relationship, it will be understood that each side of the aisle 22 could contain additional workstations, and that some of the workstations need not directly face opposite each other, but can be staggered or shifted along the aisle 22. Although bi-optical workstations have been illustrated, it will be understood that other types of workstations, including any of the above-described workstations having at least one presentation window, could be employed. The workstations 10 are used by retailers at the checkout counters 14 to process transactions involving the purchase of products 26 (see FIG. 2) bearing an identifying target, such as the UPC symbol 28 described above. As best seen in FIGS. 2-3, each workstation 10 has a generally horizontal window 12 elevated, or set flush with, a top surface of the respective counter 14, and a vertical or generally vertical, i.e., tilted, (referred to as "upright" hereinafter) window 16 set flush with, or recessed into, a raised housing portion 18 above the counter 14. Each workstation 10 either rests directly on the respective counter 14, or rests in a well formed in the counter 14.

Returning to FIG. 1, both of the windows 12, 16 of each workstation 10 are positioned to face and be accessible to a respective clerk 20 standing at one side of each counter 14 for enabling the clerk 20 to interact with the respective workstation 10. Each clerk 20 interacts with a cash register (not illustrated) to enable the clerk to receive payment for the purchased products. The register may include a debit/credit card reader and a receipt printer to print a receipt. A keypad may also be provided at the register to enable manual entry of information, such as an identifying code for any purchased product not bearing a symbol, by the clerk 20.

An entrance conveyor belt 60 is optionally located at each counter 14 at one end of each workstation 10, for conveying the products 26 to the respective workstation 10. The products 26 are typically placed on the entrance conveyor belt 60 by a customer standing at the opposite side of the counter 14. The customer typically retrieves the individual products for purchase from a shopping cart or basket for placement on the entrance conveyor belt 60. An exit conveyor belt 62 is optionally located at each counter 14 at the opposite end of each workstation 10, for conveying the products 26 placed on the exit conveyor belt 62 by the clerk 20 away from the respective workstation 10, preferably to a bagging area 64.

As schematically shown in FIG. 3, a data capture arrangement advantageously includes a plurality of imaging readers, each including a solid-state imaging subsystem 30 mounted at each window, for capturing light passing through either or both windows 12, 16 from a target 28 on the product 26. The target can be a one- or two-dimensional symbol, such as a two-dimensional symbol on a driver's license, or any document. Each reader also includes an illuminating subsystem 32 for uniformly illuminating the target 28. Although the workstation 10 illustrated in FIG. 3 is imager-based, it will be understood that it could have been laser-based.

In use, each clerk 20 processes each product 26 bearing a UPC symbol 28 thereon, past the windows 12, 16 by swiping the product 26 across a respective window, or by presenting the product 26 by holding it momentarily steady at the respective window. The symbol 28 may be located on any of the top, bottom, right, left, front and rear, sides of the product, and at least one, if not more, of the imaging subsystems 30 will capture the illumination light reflected, scattered, or otherwise returning from the symbol through one or both windows as an image. FIG. 3 also schematically depicts that a weighing scale 46 can be mounted at each workstation 10. The generally horizontal window 12 advantageously serves not only as a weighing platter for supporting a product to be weighed, but also allows the return light to pass therethrough.

As schematically also shown in FIG. 3, a product proximity or object sensor subsystem 56 is also mounted at each workstation 10 for detecting when each product 26 enters and exits the workstation 10. The object sensor subsystem 56 may, as described below, advantageously include an infrared (IR) emitter and an IR detector. The imaging subsystems 30, the associated illuminating subsystems 32, and the object sensor subsystem 56 are operatively connected to a programmed workstation microprocessor or controller 44 operative for controlling the operation of these and other components. Preferably, the controller 44 is tasked with processing the return light scattered from the target 26, and with decoding the captured target image of the return light. A memory 54 is operatively bidirectionally connected to the controller 44.

Figure 4:
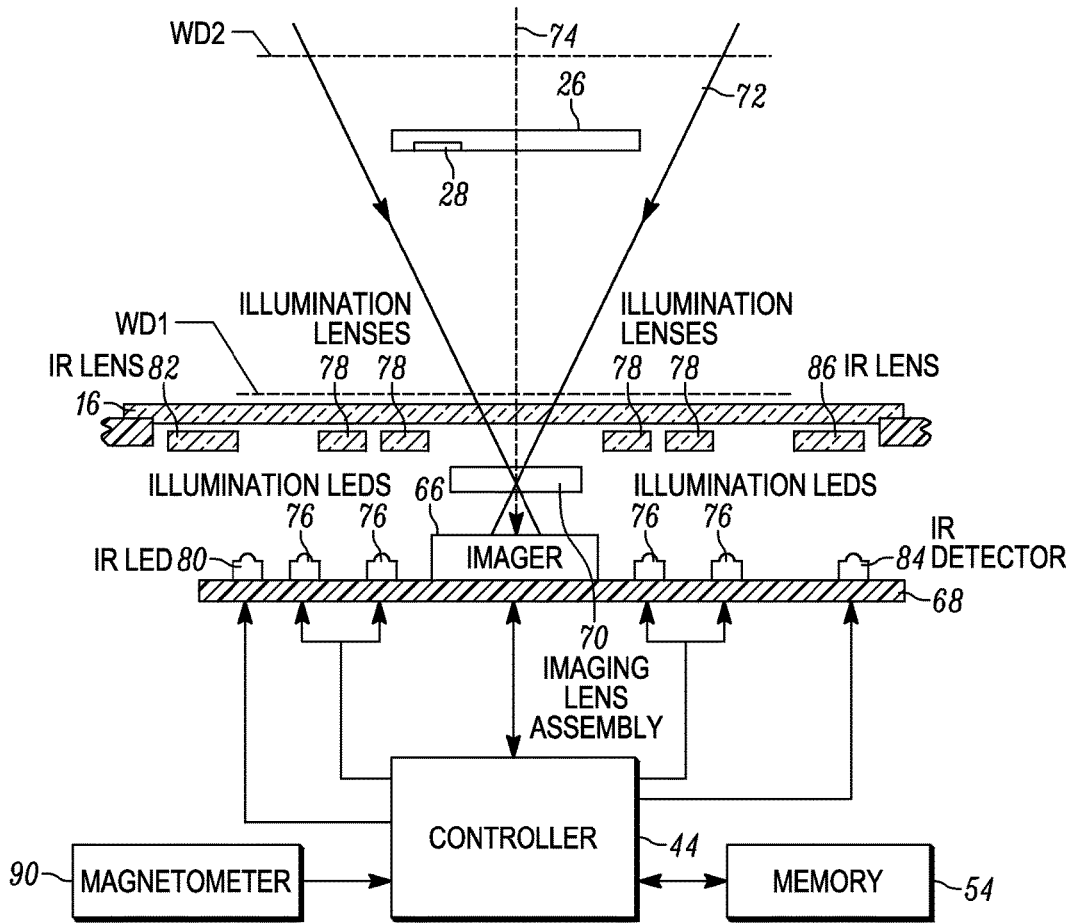
FIG. 4 is a schematic diagram depicting components of each workstation of FIG. 1 in more detail.

Turning now to FIG. 4, each imaging subsystem includes an image sensor or imager 66 mounted on a printed circuit board (PCB) 68, and an imaging lens assembly 70 mounted in front of the imager 66. The imager 66 is a solid-state device, for example, a charge coupled device (CCD) or a complementary metal-oxide-semiconductor (CMOS) device and has a linear or area array of addressable image sensors or pixels, preferably of submegapixel or supermegapixel size, having a reading field of view 72 that diverges away from the representative window 16 in both horizontal and vertical directions. The imaging lens assembly 70 has an optical axis 74 generally perpendicular to the window 16 and is operative for capturing light passing through the window 16 from the target 28 located in a range of working distances along the optical axis 74 between a close-in working distance (WD1) and a far-out working distance (WD2), and for projecting the captured light onto the imager 66. In a preferred embodiment, WD1 is about two inches from the imager 66 and generally coincides with the plane of the window 16, and WD2 is about eight inches or more from the window 16.

Each illumination subsystem 32 preferably includes a plurality of illumination light sources, e.g., two pairs of light emitting diodes (LEDs) 76, mounted on the PCB 68 and arranged at opposite sides of the imager 66. Two pairs of illumination lenses 78 are mounted in front of the illumination LEDs 76 to uniformly illuminate the target 52 with illumination light.

The object sensor subsystem 56 is also mounted in each workstation 10 and is operative for sensing entry and exit of the product 26 relative to the reading field of view 72, and for generating corresponding trigger signals. The object sensor subsystem 56 includes an object light source, preferably an infrared (IR) light emitting diode (LED) 80 mounted on the PCB 68, and an IR lens 82 mounted in front of the IR LED 80, and together operative for directing object sensing IR light, which is invisible to the human eye, in a wavelength range from about 700 nm to about 1100 nm, over a viewing angle through the window 16 at the product 26 for return therefrom through an IR lens 86, and for detection by an object light detector 84 for detecting return object sensing IR light returned from the product 26 through the window 16 over an object detection field of view. The viewing angle of the IR LED 80 is approximately equal to the object detection field of view of the IR light detector 84 for better system efficiency and pointing in the direction of the object of interest. The object detection field of view substantially overlaps the reading field of view 72.

FIG. 4 also depicts that the imager 66, the illumination LEDs 76 and the IR LED/detector 80, 84 are operatively connected to the controller 44, which is operative for controlling the operation of these electrical components. In operation, the controller 44 sends a command signal to energize the object sensor subsystem 56 to detect whether the product 26 has entered the field of view 72 from either the right or left sides thereof. If so, a trigger signal is generated to advise the controller 44 to send a control signal to energize the illuminating subsystem 32 to pulse the illumination LEDs 76 for a short time period of, for example, 500 microseconds or less, and to energize the imager 66 to collect illumination light reflected and/or scattered from the target 28 substantially only during said time period. A typical imager needs about 16-33 milliseconds to read the entire target image and operates at a frame rate of about 30-90 frames per second. The memory 54 can buffer multiple images of the target 28 captured over successive frames.

As described above, one issue with the venue layout depicted in FIGS. 1-2 where the presentation windows 16 of at least two different workstations 10 generally faced each other involved the accidental generation of the illumination light. To repeat, the IR sensor 84 of a first workstation looking through a first presentation window 16 might be so positioned so as to sense the IR light emitted by the IR emitter 80 through a second presentation window 16 of a second workstation 10. Put another way, the IR detection field of view of the IR sensor 84 of the first workstation 10 at least partially overlaps the IR emission field of the IR emitter 80 of the second workstation 10. This false triggering of the object sensor subsystem 56 caused the controller 44 to accidentally generate illumination light, which, as explained above, was not only very bothersome and annoying to operators and customers, but also wasted electrical power, and shortened the operational lifetime of the workstations 10. The present disclosure is directed to preventing the object sensor subsystem 56 from being falsely triggered, and for preventing the illumination light from being accidentally generated.

In accordance with the present disclosure, a magnetometer 90 (see FIG. 4) is operatively connected to each controller 44. Each magnetometer 90 is operative for determining a direction faced by a respective presentation window 16. Each magnetometer 90 has a magnetic field full scale ranging from about plus or minus 1.3 gauss to about plus or minus 8.1 gauss and is sensitive enough to sense the Earth's magnetic field (0.25 to 0.65 gauss), as well as to determine the direction faced by the workstation window 16.

Figure 5:
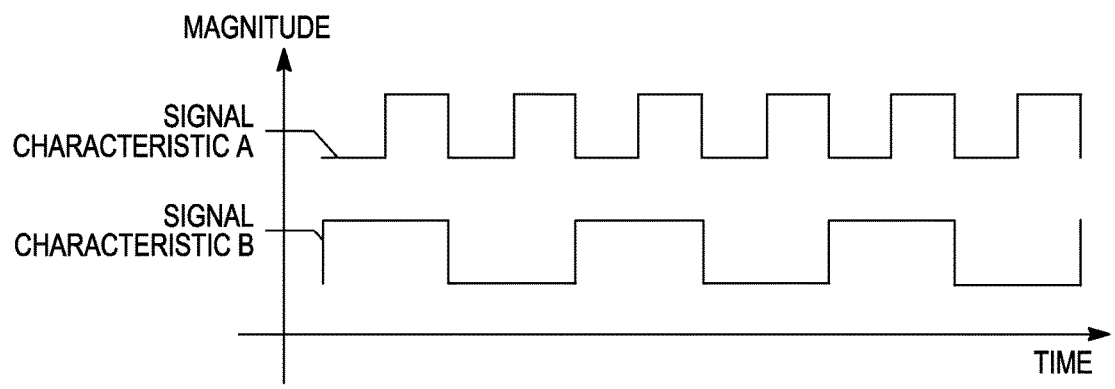
FIG. 5 is a graph depicting two different signal characteristics that are preprogrammed and stored in each workstation.

Each controller 44 controls a respective object sensor subsystem 56 to emit the aforementioned command signal from the IR emitter 80, and to receive the aforementioned command signal at the IR detector 84, with a first signal characteristic, e.g., pulse signal characteristic A in FIG. 5, when the respective magnetometer 90 determines that the respective presentation window 16 faces a first direction, and also controls a respective object sensor subsystem 56 to emit the aforementioned command signal from the IR emitter 80, and to receive the aforementioned command signal at the IR detector 84, with a second signal characteristic, e.g., pulse signal characteristic B in FIG. 5, which is different from the first signal characteristic, when the respective magnetometer 90 determines that the respective presentation window 16 faces a second direction, which is different from the first direction. The first and second signal characteristics A and B are stored in memory 54. The first and second signal characteristics A and B differ in signal frequency and/or in signal coding modulation and/or in another characteristic. Each controller 44 selects the first stored signal characteristic A when the respective magnetometer 90 determines the first direction, and selects the second stored signal characteristic B when the respective magnetometer 90 determines the second direction. Thus, each controller 44 energizes the respective illumination subsystem 32 when the respective object sensor subsystem 56 detects the product, and does not energize the respective illumination subsystem when the first and second signal characteristics are different, i.e., when the presentation windows 16 of the workstations 10 generally face each other in opposite directions.

Figure 6:
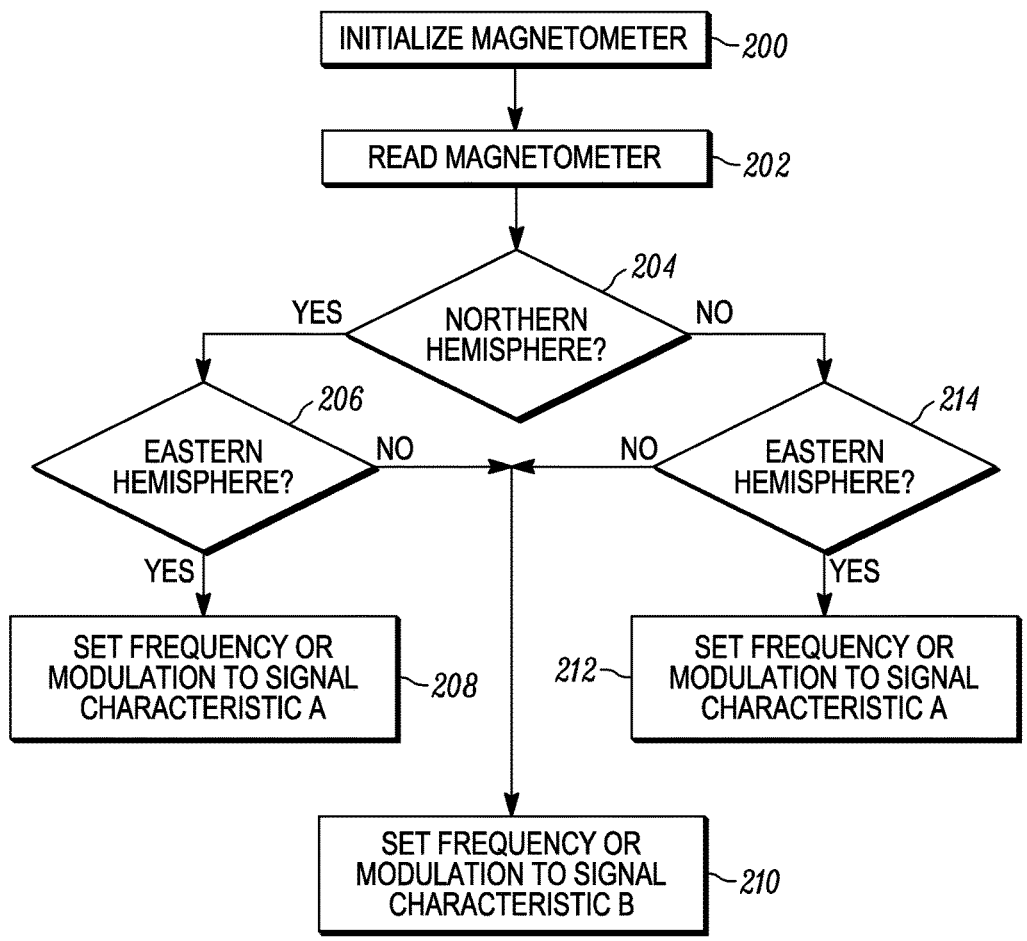
FIG. 6 is a flow chart depicting steps performed in accordance with a method of automatically avoiding signal interference between product proximity subsystems that emit signals through mutually facing presentation windows of different workstations in accordance with the present disclosure.

In the flow chart of FIG. 6, the magnetometer 90 is initialized in step 200 and read by the controller 44 in step 202. In the illustrated scenario, step 204 determines whether the window 16 is in the Northern or the Southern hemisphere. If the window 16 is in the Northern hemisphere, then step 206 determines whether the window 16 is in the Eastern or the Western hemisphere. If the window 16 is in the Eastern hemisphere, then step 208 is performed in which the controller 44 selects the signal characteristic A. If the window 16 is in the Western hemisphere, then step 210 is performed in which the controller 44 selects the signal characteristic B.

If the window 16 was determined in step 204 to be in the Southern hemisphere, then step 214 determines whether the window 16 is in the Eastern or the Western hemisphere. If the window 16 is in the Eastern hemisphere, then step 212 is performed in which the controller 44 selects the signal characteristic A. If the window 16 is in the Western hemisphere, then step 210 is performed in which the controller 44 selects the signal characteristic B.

Figure 7:
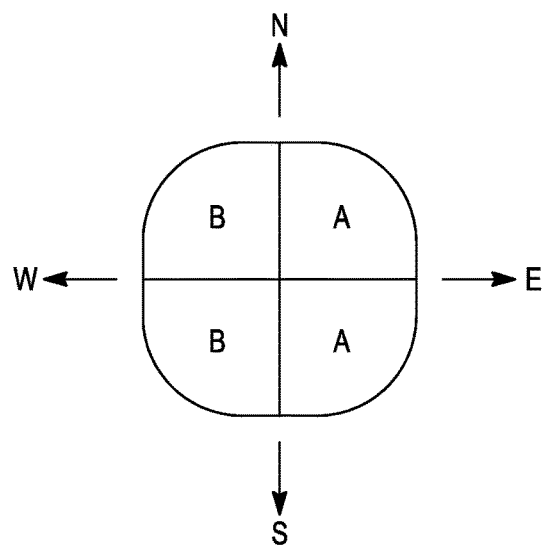
FIG. 7 is a symbolic summary of the different signal characteristics as a function of direction in accordance with the flow chart of FIG. 6.

FIG. 7 summarizes these settings, in which the signal characteristic A is selected if the window 16 faces both Northeast and Southeast, and the signal characteristic B is selected if the window 16 faces both Northwest and Southwest. Although only two characteristics are illustrated in FIG. 5, more than two signal characteristics could have been employed. Although only four direction settings are illustrated in FIG. 7, more than four direction settings could have been employed.

In the foregoing specification, specific embodiments have been described. However, one of ordinary skill in the art appreciates that various modifications and changes can be made without departing from the scope of the invention as set forth in the claims below. For example, rather than an IR-based object sensor subsystem 56, an acoustic-based object sensor subsystem could have been employed. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system for automatically avoiding signal interference between product proximity subsystems that emit signals through mutually facing presentation windows of different workstations, comprising:
   a magnetometer in each workstation, each magnetometer being operative for determining a direction faced by a respective presentation window; and
   a controller in each workstation and operatively connected to each magnetometer and each product proximity subsystem, each controller being operative for controlling a respective product proximity subsystem to emit and receive a signal with a first signal characteristic when the respective magnetometer determines that the respective presentation window faces a first direction, and for controlling a respective product proximity subsystem to emit and receive a signal with a second signal characteristic, which is different from the first signal characteristic, when the respective magnetometer determines that the respective presentation window faces a second direction, which is different from the first direction.

2. The system of claim 1, wherein each controller has a memory in which the first and second signal characteristics are stored, wherein each controller selects the first stored signal characteristic when the respective magnetometer determines the first direction, and wherein each controller selects the second stored signal characteristic when the respective magnetometer determines the second direction.

3. The system of claim 1, wherein each workstation includes an illumination subsystem to illuminate a product with illumination light, wherein each proximity subsystem includes an infrared (IR) emitter operative for emitting IR light through a respective presentation window into an IR emission field, and an IR sensor for sensing return IR light from the product through a respective presentation window within an IR detection field of view; and wherein each controller is operative for energizing the respective illumination subsystem when the respective proximity subsystem detects the product, and for not energizing the respective illumination subsystem when the first and second signal characteristics are different.

4. The system of claim 1, wherein the first and second signal characteristics differ in signal frequency.

5. The system of claim 1, wherein the first and second signal characteristics differ in signal coding modulation.

6. The system of claim 1, wherein the presentation windows are upright and generally planar, and generally face each other in the first and second directions that are opposite to each other.

7. A system for automatically avoiding signal interference between product proximity subsystems that emit signals through mutually facing, upright presentation windows of different workstations having illumination subsystems, comprising:
   a magnetometer in each workstation, each magnetometer being operative for determining a direction faced by a respective presentation window; and
   a controller in each workstation and operatively connected to each magnetometer and each product proximity subsystem, each controller being operative for controlling a respective product proximity subsystem to emit and receive a signal with a first signal characteristic when the respective magnetometer determines that the respective presentation window faces a first direction, and for controlling a respective product proximity subsystem to emit and receive a signal with a second signal characteristic, which is different from the first signal characteristic, when the respective magnetometer determines that the respective presentation window faces a second direction, which is different from the first direction,
   each controller being further operative for energizing the respective illumination subsystem when the respective proximity subsystem detects the product, and for not energizing the respective illumination subsystem when the first and second signal characteristics are different.

8. The system of claim 7, wherein each controller has a memory in which the first and second signal characteristics are stored, wherein each controller selects the first stored signal characteristic when the respective magnetometer determines the first direction, and wherein each controller selects the second stored signal characteristic when the respective magnetometer determines the second direction.

9. The system of claim 7, wherein each proximity subsystem includes an IR emitter operative for emitting infrared (IR) light through a respective presentation window into an IR emission field, and an IR sensor for sensing return IR light from the product through a respective presentation window within an IR detection field of view.

10. The system of claim 7, wherein the first and second signal characteristics differ in signal frequency.

11. The system of claim 7, wherein the first and second signal characteristics differ in signal coding modulation.

12. The system of claim 7, wherein the presentation windows are upright and generally planar, and generally face each other in the first and second directions that are opposite to each other.

13. A method of automatically avoiding signal interference between product proximity subsystems that emit signals through mutually facing presentation windows of different workstations, comprising:
   determining a direction faced by a respective presentation window;
   controlling a respective product proximity subsystem to emit and receive a signal with a first signal characteristic upon the determination that the respective presentation window faces a first direction; and
   controlling a respective product proximity subsystem to emit and receive a signal with a second signal characteristic, which is different from the first signal characteristic, upon the determination that the respective presentation window faces a second direction, which is different from the first direction.

14. The method of claim 13, and storing the first and second signal characteristics, selecting the first stored signal characteristic when the first direction is determined, and selecting the second stored signal characteristic when the second direction is determined.

15. The method of claim 13, and illuminating a product with illumination light; and configuring each proximity subsystem with an infrared (IR) emitter for emitting IR light through a respective presentation window into an IR emission field, and with an IR sensor for sensing return IR light from the product through a respective presentation window within an IR detection field of view; and energizing the respective illumination subsystem when the respective proximity subsystem detects the product, and not energizing the respective illumination subsystem when the first and second signal characteristics are different.

16. The method of claim 13, and configuring the first and second signal characteristics to differ in signal frequency.

17. The method of claim 13, and configuring the first and second signal characteristics to differ in signal coding modulation.

18. The method of claim 13, and configuring the presentation windows as upright and generally planar, and positioning the presentation windows to generally face each other in the first and second directions that are opposite to each other.

* * * * *